(12) United States Patent
Chalmers

(10) Patent No.: US 12,146,561 B2
(45) Date of Patent: Nov. 19, 2024

(54) ELECTRIC MOTOR AND BELT TRANSMISSION SHAFT SYSTEM

(71) Applicant: Todd C Chalmers, Las Vegas, NV (US)

(72) Inventor: Todd C Chalmers, Las Vegas, NV (US)

( * ) Notice: Subject to any disclaimer, the term of this patent is extended or adjusted under 35 U.S.C. 154(b) by 0 days.

(21) Appl. No.: 18/489,375

(22) Filed: Oct. 18, 2023

(65) Prior Publication Data

US 2024/0133457 A1 Apr. 25, 2024
US 2024/0229913 A9 Jul. 11, 2024

Related U.S. Application Data

(60) Provisional application No. 63/380,206, filed on Oct. 19, 2022.

(51) Int. Cl.
| | |
|---|---|
| *F16H 57/021* | (2012.01) |
| *F16C 3/02* | (2006.01) |
| *F16D 1/108* | (2006.01) |
| *F16D 3/06* | (2006.01) |
| *F16H 7/02* | (2006.01) |
| *F16H 57/02* | (2012.01) |
| *F16H 57/035* | (2012.01) |

(52) U.S. Cl.
CPC ............ *F16H 57/021* (2013.01); *F16C 3/02* (2013.01); *F16D 1/108* (2013.01); *F16D 3/06* (2013.01); *F16H 7/02* (2013.01); *F16H 57/035* (2013.01); *F16H 2057/02034* (2013.01)

(58) Field of Classification Search
CPC .... F16H 57/021; F16H 57/035; F16H 57/033; F16H 2057/02034; F16H 7/02; F16D 1/108; F16D 3/06; F16D 2001/103; F16C 3/02
USPC ......................................................... 474/166
See application file for complete search history.

(56) References Cited

U.S. PATENT DOCUMENTS

| | | | | |
|---|---|---|---|---|
| 610,576 | A * | 9/1898 | Auger | F16D 1/0876 403/358 |
| 827,023 | A * | 7/1906 | Knoener | F16D 1/0876 411/948 |
| 1,909,500 | A * | 5/1933 | Ornitz | F16D 1/06 474/903 |
| 2,038,554 | A * | 4/1936 | Edgar | F16D 1/092 403/359.5 |
| 2,609,700 | A * | 9/1952 | Montemarani | F16H 9/16 474/29 |
| 2,625,415 | A * | 1/1953 | Smith | F16D 1/116 29/451 |
| 2,633,031 | A * | 3/1953 | Browning | F16H 55/566 474/33 |

(Continued)

Primary Examiner — Henry Y Liu

(57) ABSTRACT

The present invention has an electric motor, a transmission shaft, a transmission casing, and a pulley. The transmission shaft has splines, bearings, bearing stops, a pulley keyway, and a threaded end. The prototype transmission casing has a shaft receiver. The electric motor rotates the transmission shaft with torque force. The transmission shaft rotation causes the pulley to rotate. Although the invention has been explained in relation to its preferred embodiment, it is to be understood that many other possible modifications, variations and sizes can be made without departing from the spirit and scope of the invention.

20 Claims, 5 Drawing Sheets

(56) References Cited

U.S. PATENT DOCUMENTS

| | | | | | |
|---|---|---|---|---|---|
| 2,640,552 | A | * | 6/1953 | Chillson | B64C 11/325 416/49 |
| 2,641,981 | A | * | 6/1953 | Pilsner | A01B 41/04 474/33 |
| 2,700,288 | A | * | 1/1955 | Wissing | D06F 7/02 366/325.1 |
| 2,902,868 | A | * | 9/1959 | Ferrara | B06B 1/163 74/61 |
| 2,925,293 | A | * | 2/1960 | Voss | F16H 57/0025 474/903 |
| 2,933,934 | A | * | 4/1960 | Haroldson | F16H 55/36 474/166 |
| 2,960,358 | A | * | 11/1960 | Christison | F16D 1/0882 403/14 |
| 3,608,936 | A | * | 9/1971 | Karden | F16D 1/108 403/322.2 |
| 3,680,404 | A | * | 8/1972 | Firth | F16H 55/566 474/33 |
| 3,815,432 | A | * | 6/1974 | Maurey | B66D 3/04 474/43 |
| 3,943,785 | A | * | 3/1976 | Percifield | A01D 34/6806 474/93 |
| 3,944,026 | A | * | 3/1976 | Rhodes | F16C 33/6622 184/7.1 |
| 4,095,803 | A | * | 6/1978 | Meier | F01P 5/10 277/944 |
| 4,124,318 | A | * | 11/1978 | Sagady | F16D 3/226 403/14 |
| 4,504,249 | A | * | 3/1985 | Fortier | F16H 55/566 474/33 |
| 4,572,698 | A | * | 2/1986 | Rauch | F16D 1/0876 403/318 |
| 4,592,124 | A | * | 6/1986 | Keith | B25B 27/023 29/266 |
| 4,695,183 | A | * | 9/1987 | Greenberg | F16D 1/0876 403/259 |
| 4,813,808 | A | * | 3/1989 | Gehrke | F16D 3/224 403/372 |
| 4,998,905 | A | * | 3/1991 | Martin | F16H 55/56 474/42 |
| 5,052,842 | A | * | 10/1991 | Janatka | F16H 55/171 403/14 |
| 5,269,662 | A | * | 12/1993 | Denton | F04B 35/00 417/362 |
| 5,275,577 | A | * | 1/1994 | Hildebrandt | H02K 7/1004 474/166 |
| 5,370,587 | A | * | 12/1994 | Johnson | F16H 55/36 474/166 |
| 5,418,400 | A | * | 5/1995 | Stockton | F02N 11/04 290/22 |
| 5,720,685 | A | * | 2/1998 | Malone | F16H 55/36 474/190 |
| 5,807,180 | A | * | 9/1998 | Knodle | F16D 1/0882 464/144 |
| 6,022,286 | A | * | 2/2000 | Jackson | F16H 55/49 474/170 |
| 6,425,838 | B1 | * | 7/2002 | Matsubara | F02N 15/006 903/910 |
| 6,470,766 | B2 | * | 10/2002 | Ohta | F16H 35/10 74/411 |
| 6,729,117 | B2 | * | 5/2004 | Frazer | A01D 34/6806 418/206.8 |
| 7,028,573 | B2 | * | 4/2006 | Inaba | E05F 5/00 74/421 A |
| 7,919,892 | B2 | * | 4/2011 | Neet | H02K 7/08 310/90 |
| 7,972,097 | B2 | * | 7/2011 | Elrod | B23Q 17/10 409/187 |
| 8,052,535 | B2 | * | 11/2011 | Miyawaki | B62D 1/185 384/42 |
| 8,133,142 | B2 | * | 3/2012 | Gerlich | F16D 1/108 474/166 |
| 8,267,615 | B2 | * | 9/2012 | Zhang | F16D 1/0882 403/356 |
| 8,286,524 | B2 | * | 10/2012 | Tang | F16D 1/116 74/411 |
| 8,708,611 | B2 | * | 4/2014 | Marshansky | B23C 5/1072 408/226 |
| 9,897,190 | B2 | * | 2/2018 | Yu | H02K 7/1004 |
| 10,428,941 | B2 | * | 10/2019 | Thompson | F16H 63/32 |
| 10,480,627 | B1 | * | 11/2019 | Vroom | B60P 3/34 |
| 10,830,330 | B2 | * | 11/2020 | Yu | F02N 11/04 |
| 10,851,885 | B2 | * | 12/2020 | Zulauf | F16H 1/28 |
| 10,882,438 | B2 | * | 1/2021 | Garceau | F16H 19/04 |
| 10,927,929 | B2 | * | 2/2021 | Vroom | F16H 19/04 |
| 11,047,457 | B2 | * | 6/2021 | Vroom | B60P 3/34 |
| 11,137,054 | B2 | * | 10/2021 | Vroom | F16H 19/04 |
| 11,353,064 | B2 | * | 6/2022 | Chaillou | F16D 1/0858 |
| 11,384,827 | B2 | * | 7/2022 | Harris | B62D 5/04 |
| 11,979,063 | B2 | * | 5/2024 | Takahashi | H02P 27/06 |
| 2001/0009078 | A1 | * | 7/2001 | Ohta | F16H 35/10 172/125 |
| 2002/0043062 | A1 | * | 4/2002 | Frazer | A01D 34/6806 56/255 |
| 2002/0047376 | A1 | * | 4/2002 | Torii | E05F 11/505 310/83 |
| 2005/0115350 | A1 | * | 6/2005 | Ohashi | H02K 7/081 74/425 |
| 2009/0016833 | A1 | * | 1/2009 | Elrod | B23Q 17/10 409/203 |
| 2010/0060062 | A1 | * | 3/2010 | Koga | B60N 2/067 297/344.1 |
| 2011/0052316 | A1 | * | 3/2011 | Chen | F16D 3/06 403/356 |
| 2011/0268499 | A1 | * | 11/2011 | Zhang | F16D 1/0882 403/358 |
| 2014/0338580 | A1 | * | 11/2014 | Maynard | B63H 25/04 114/144 R |
| 2015/0211633 | A1 | * | 7/2015 | Thompson | F16H 63/36 74/362 |
| 2020/0248786 | A1 | * | 8/2020 | Vroom | B60P 3/34 |
| 2020/0336031 | A1 | * | 10/2020 | Takahashi | H02K 1/165 |
| 2021/0095745 | A1 | * | 4/2021 | Vroom | B60P 3/34 |
| 2021/0332876 | A1 | * | 10/2021 | Graham | F16D 1/10 |

* cited by examiner

ELECTRIC MOTOR AND BELT TRANSMISSION SHAFT SYSTEM

FIELD OF THE INVENTION

The present invention relates generally to an apparatus for cars. More specifically, the present invention is an apparatus for cars, and on road vehicles, related to the transmission.

BACKGROUND OF THE INVENTION

The present inventor is trying to patent the transmission case, shaft, and motor from companies wanting to build them. The present invention is a method invention, the transmission with motor attached will turn the drive line of a rear end vehicle or any on road vehicle and cause it to run forward or backwards with a belt connected to the pully on the transmission and a pully on the drive line. The present inventor for his prototype used a Chinese truck rear differential case, drilled a hole in the top cap, and put a shaft in so it will turn a pulley. Also, the inventor cut the bottom u-shaped bolts off the bottom of the case.

DETAIL DESCRIPTIONS OF THE INVENTION

Figure 1:
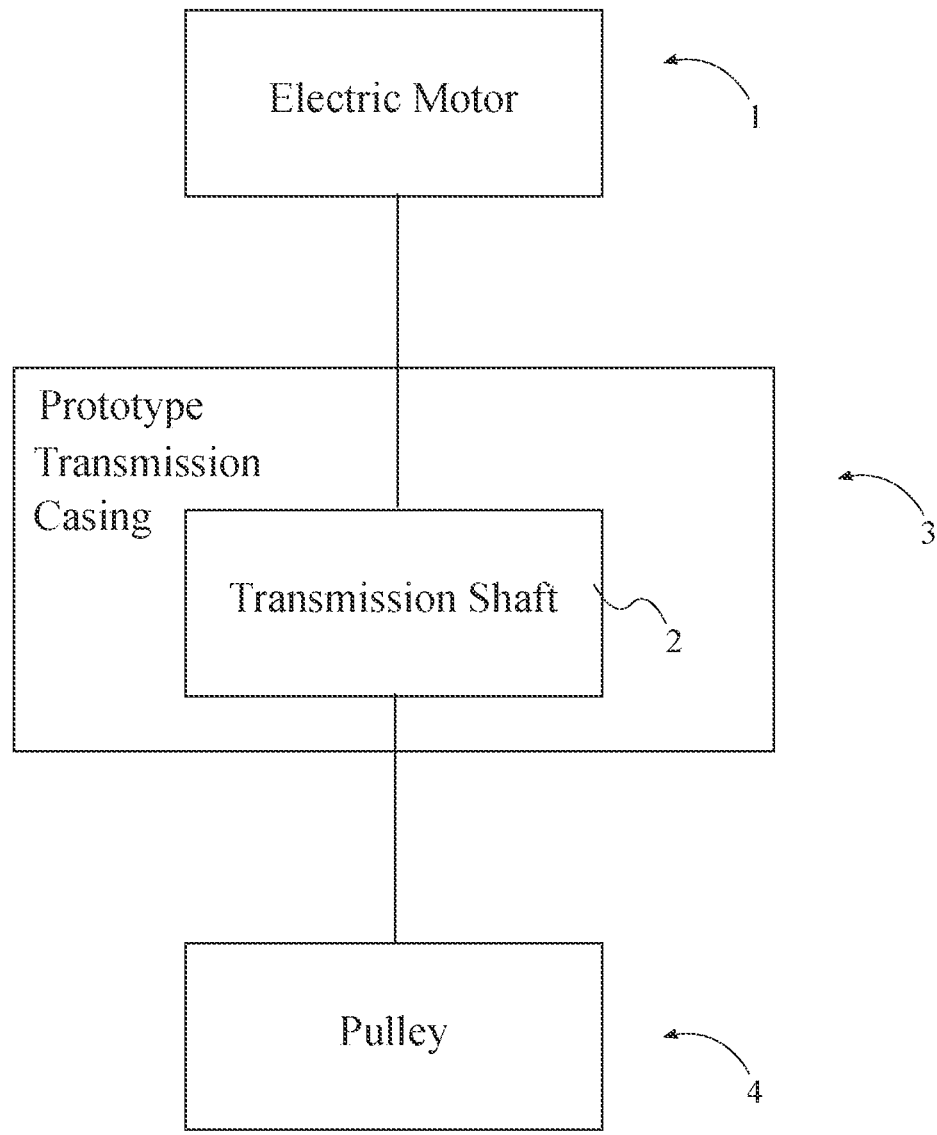
FIG. 1 is a block diagram of the present invention.

All illustrations of the drawings are for the purpose of describing selected versions of the present invention and are not intended to limit the scope of the present invention.

One embodiment of the current invention may be described as follows, a casing, gearbox casing with some of it cut off, drilling a hole in the cap, and installed a shaft. The embodiment having a transmission case, shaft, and motor from companies wanting to build them. The present embodiment is a transmission with motor attached, will turn the drive line of a rear end vehicle, or any on road vehicle, and cause it to run forward or backward, with a belt connected to the pully 4 on the transmission, and a pully 4 on the drive line can also be connected the pully 4 on the cars gas motor or engine, after the valves, pistons, ignition and air filter, the inner working parts have been removed, so the car engine acts like a bracket for the electric motor 1 and transmission to secure to. The present embodiment has components that include an electric motor 1, transmission casing 3, and transmission shaft 2. The electric motor 1, the transmission casing 3 and the shaft are arranged. The present embodiment used a Chinese truck rear end differential case, drilled a hole in the top cap, and put a shaft in so it will turn a pully 4. Also the present inventor cut the bottom u-shaped bolts off the bottom of the case.

In reference to FIG. 1-5, the present invention is an electric motor 1 with a belt transmission shaft 2 system. The present invention can also be connected to the pully 4 on a drive line on vehicles. The present invention comprises an electric motor 1, a transmission shaft 2, an prototype transmission casing 3, and a pulley 4. The phrase "prototype transmission casing 3" should be understood to include reference to "adapted transmission casing". The transmission shaft 2 comprises a plurality of splines 21, a plurality of bearings stops 23, a plurality of bearing stops, a pulley keyway 24, and a threaded end 25. The prototype transmission casing 3 comprises a shaft receiver 31. The electric motor 1 is mechanically connected to the transmission shaft 2. As a result, the electric motor 1 rotates the transmission shaft 2 with torque force. The prototype transmission casing 3 encompasses a portion of the transmission shaft 2. Consequently, the prototype transmission casing 3 secures the transmission shaft 2 in place with an external cap and drilled hole that allows for the transmission shaft 2 to pass through. The pulley 4 is mechanically connected to the terminal end of the transmission shaft 2 opposite the electric motor 1. Accordingly, the transmission shaft 2 rotation causes the pulley 4 to rotate. The transmission shaft 2 being a cylindrical shape. Thus, the transmission shaft 2 facilitates rotational motion. The plurality of splines 21 traverses along the length of the terminal end of the transmission shaft 2. So, the plurality of splines 21 creates a notched surface allowing the electric motor 1 to connect. The plurality of splines 21 mechanically connects the transmission shaft 2 to the electric motor 1.

Figure 4:
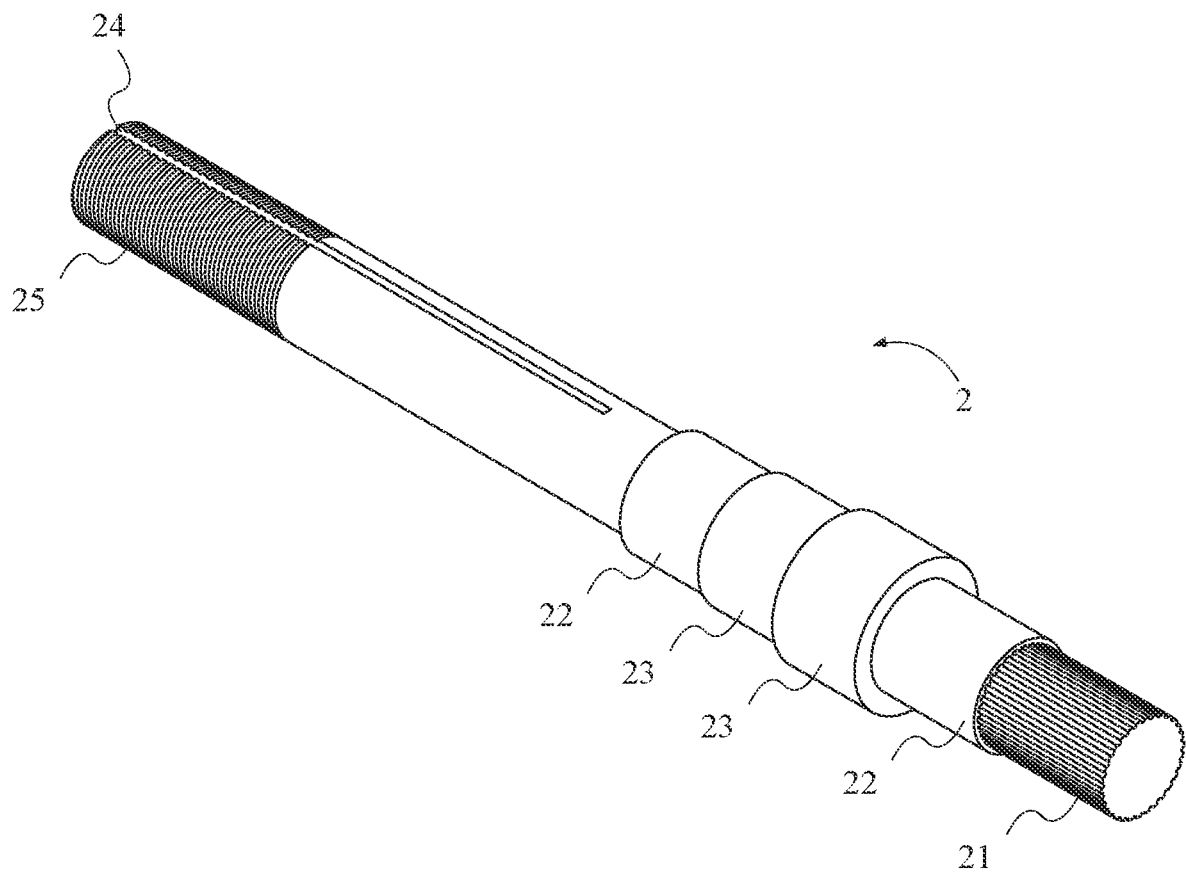
FIG. 4 is a top front right view of the transmission shaft.
Figure 5:
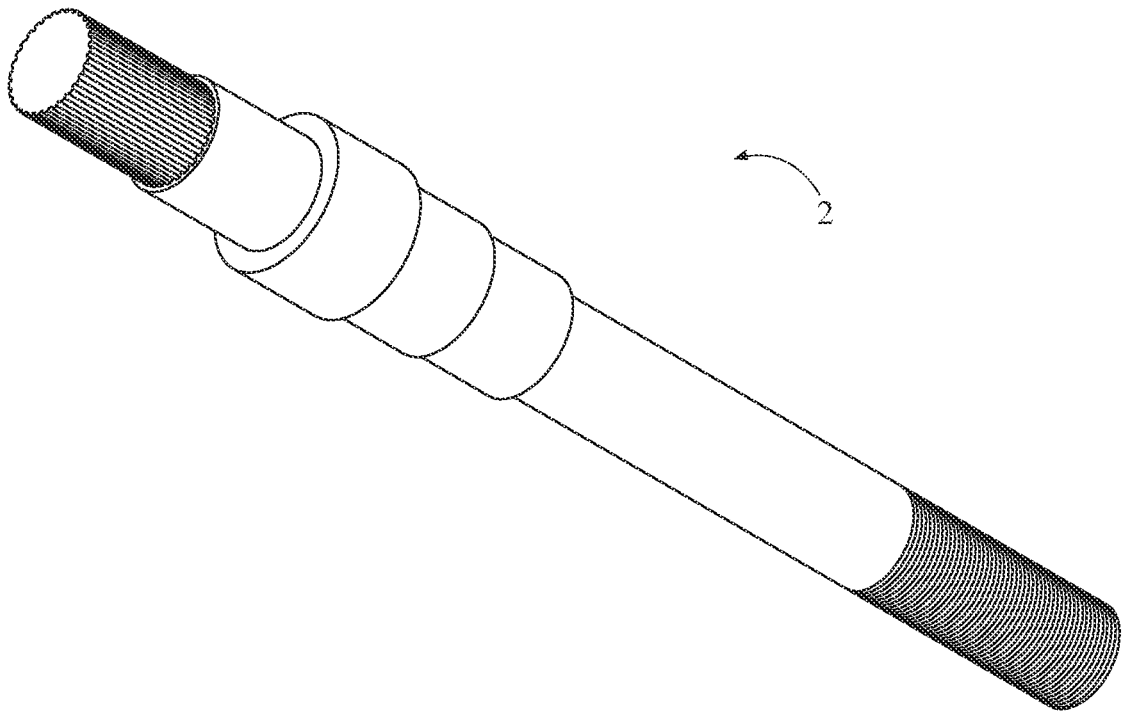
FIG. 5 is a bottom rear left view of the transmission shaft.
All illustrations of the drawings are for the purpose of describing selected versions of the present invention and are not intended to limit the scope of the present invention.

In reference to FIG. 4, the plurality of bearings stops 23 is positioned along the transmission shaft 2. As a result, the plurality of bearings stops 23 is spaced out along the transmission shaft 2 to connect with the prototype transmission casing 3. The plurality of bearings stops 23 comprises a left and a right bearing. The plurality of bearings stops 23 secures the transmission shaft 2 within the prototype transmission casing 3. Consequently, the plurality of bearings stops 23 secures the transmission shaft 2 along the prototype transmission casing 3. The plurality of bearings stops 23 allows for rotational motion along the transmission shaft 2 central axis. Accordingly, the plurality of bearings stops 23 secures the prototype transmission casing 3 while the transmission shaft 2 rotates.

As seen in FIG. 4, the left bearing is positioned further away from the plurality of splines 21 than the right bearing. The left bearing has a larger diameter than the right bearing. Thus, the left bearing and right bearing fit into the prototype transmission casing 3. The plurality of bearings stops 23 stops is positioned in between the plurality of bearings stops 23. So, the plurality of bearing stops prevents the plurality of bearings stops 23 from shifting on the transmission shaft 2. The plurality of bearing stops comprises a left bearing stop and a right bearing stop. The plurality of bearing stops has a cylindrical shape.

In reference to FIG. 4, the left bearing stop is positioned adjacent to the left bearing. As a result, the left bearing stop secures the left bearing in place. The right bearing stop is positioned adjacent to the right bearing. Consequently, the right bearing stop secures the right bearing in place. The plurality of bearing stops has a larger diameter than the plurality of bearings stops 23. Accordingly, this ensures that the plurality of bearings stops 23 cannot move past the plurality of bearing stops. The right bearing stop has a smaller diameter than the left bearing stop. Thus, the transmission shaft 2 cannot slide out of the prototype transmission casing 3 because the external cap with a drilled hole secures the transmission shaft 2 in place. The pulley keyway 24 is positioned along the terminal end of the transmission shaft 2 opposite the plurality of splines 21. So, the pulley 4 interacts with the transmission shaft 2 away from the electric motor 1. The pulley keyway 24 is not encompassed by the prototype transmission casing 3. As a result, the pulley keyway 24 is positioned on the outside of the prototype transmission casing 3 and can interact with a pulley 4. The threaded end 25 is positioned along the terminal end of the transmission shaft 2 adjacent to the pulley keyway 24. The threaded end 25 receives an external bolt and washer.

Figure 2:
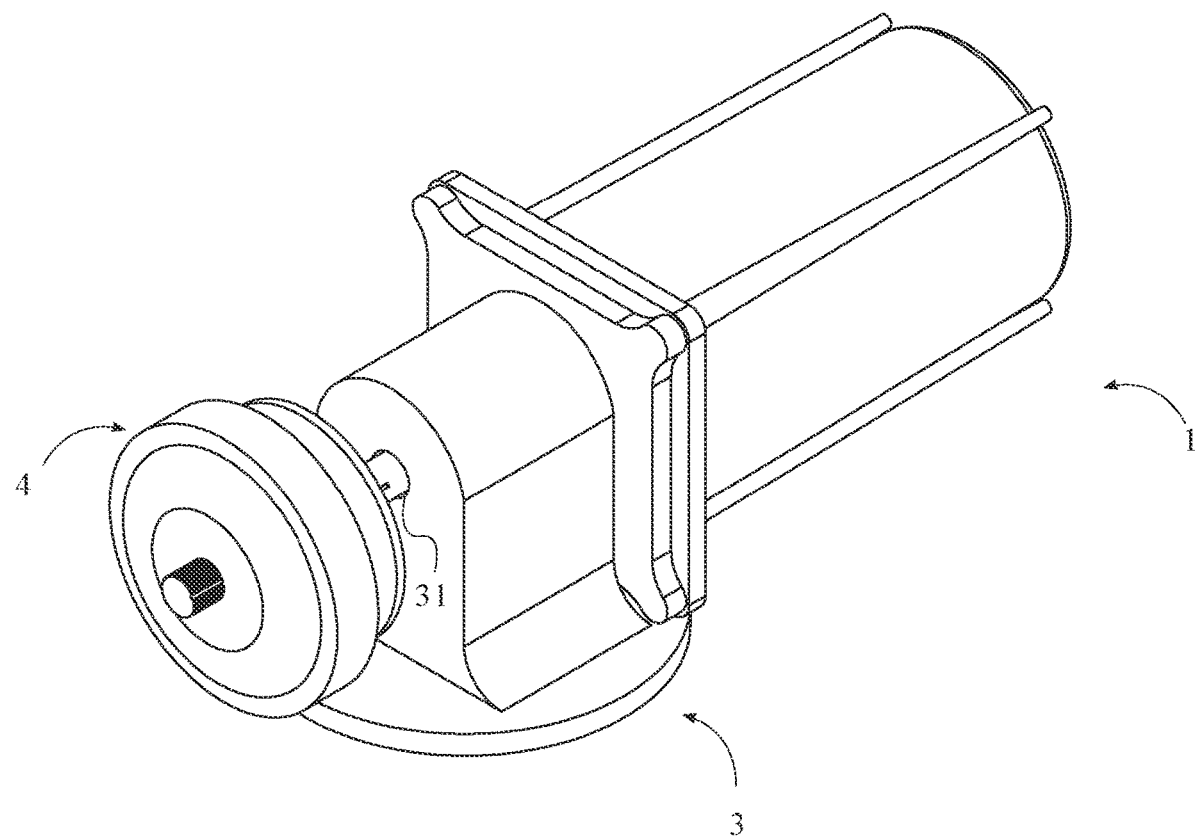
FIG. 2 is a top front right view of the present invention.
Figure 3:
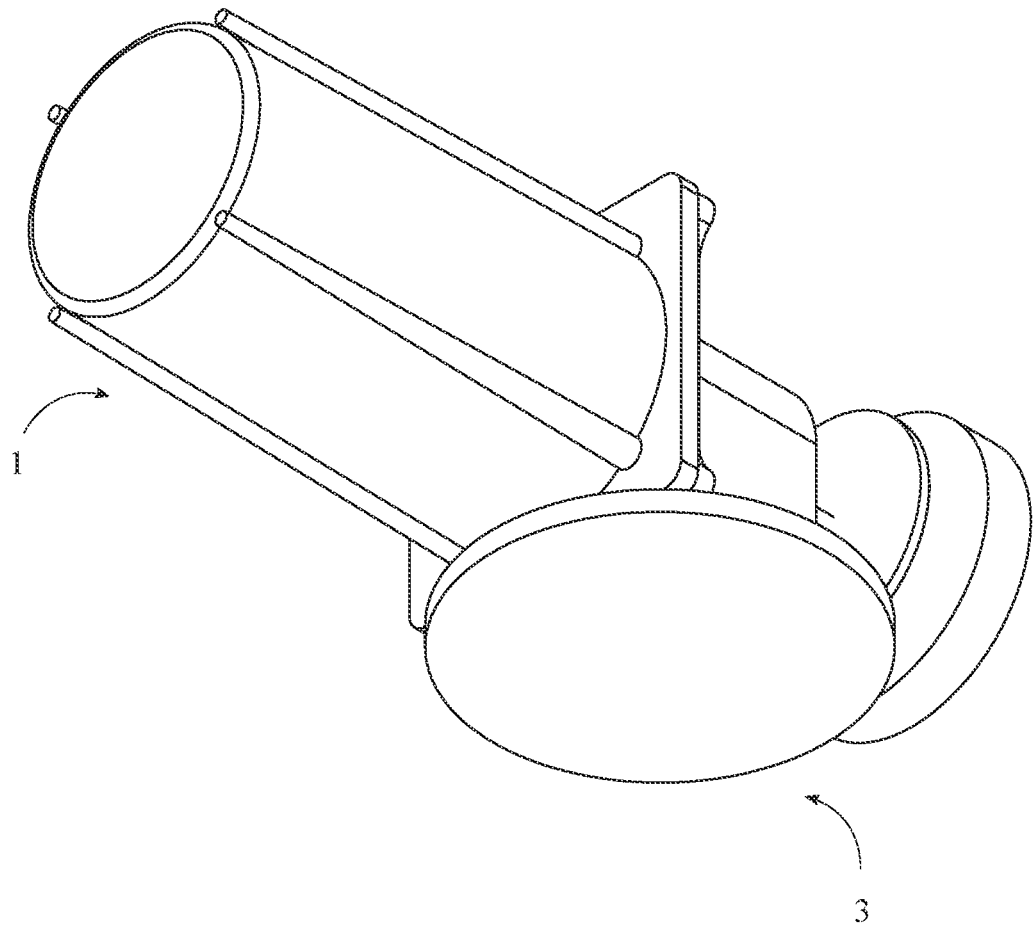
FIG. 3 is a bottom rear left view of the present invention.

As seen in FIG. 2, the shaft receiver 31 receives the transmission shaft 2. The shaft receiver 31 secures the transmission shaft 2 in place while allowing rotational movement. Accordingly, the transmission shaft 2 rotates while positioned within the prototype transmission casing 3. The pulley 4 is received by the pulley keyway 24. Thus, the pulley 4 wraps around the transmission shaft 2. The pulley 4 rotates as the transmission shaft 2 rotates due to the electric motor 1 rotation. So, as the electric motor 1 rotates the transmission shaft 2, the rotational motion is transferred to the pulley 4 attached on the opposite end of the transmission shaft 2.

Although the invention has been explained in relation to its preferred embodiment, it is to be understood that many other possible modifications and variations can be made without departing from the spirit and scope of the invention as hereinafter claimed.

What is claimed is:

1. An electric motor and belt transmission shaft system comprising:
   an electric motor;
   a transmission shaft;
   a prototype transmission casing;
   a pulley;
   the transmission shaft comprising a plurality of splines, a plurality of bearings, a plurality of bearing stops, a pulley keyway, and a threaded end;
   the prototype transmission casing comprising a shaft receiver;
   the electric motor being mechanically connected to the transmission shaft;
   the prototype transmission casing encompassing a portion of the transmission shaft; and,
   the pulley being mechanically connected to the terminal end of the transmission shaft opposite the electric motor.

2. The electric motor and belt transmission shaft system as claimed in claim 1 comprising:
   The transmission shaft being a cylindrical shape;
   the plurality of splines traversing along the length of the terminal end of the transmission shaft; and
   the plurality of splines mechanically connecting the transmission shaft to the electric motor.

3. The electric motor and belt transmission shaft system as claimed in claim 1 comprising:
   the plurality of bearings being positioned along the transmission shaft;
   the plurality of bearings comprising a left and a right bearing;
   the plurality of bearings securing the transmission shaft within the prototype transmission casing; and
   the plurality of bearings allowing for rotational motion along the transmission shaft central axis.

4. The electric motor and belt transmission shaft system as claimed in claim 3 comprising:
   the left bearing being positioned further away from the plurality of splines than the right bearing; and
   the left bearing having a larger diameter than the right bearing.

5. The electric motor and belt transmission shaft system as claimed in claim 1 comprising:
   the plurality of bearings stops being positioned in between the plurality of bearings;
   the plurality of bearing stops comprising a left bearing stop and a right bearing stop; and
   the plurality of bearing stops having a cylindrical shape.

6. The electric motor and belt transmission shaft system as claimed in claim 5 comprising:
   the left bearing stop being positioned adjacent to the left bearing;
   the right bearing stop being positioned adjacent to the right bearing;
   the plurality of bearing stops having a larger diameter than the plurality of bearings; and
   the right bearing stop having a smaller diameter than the left bearing stop.

7. The electric motor and belt transmission shaft system as claimed in claim 1 comprising:
   the pulley keyway being positioned along the terminal end of the transmission shaft opposite the plurality of splines;
   the pulley keyway not being encompassed by the prototype transmission casing;
   the threaded end being positioned along the terminal end of the transmission shaft adjacent to the pulley keyway; and
   the threaded end receiving an external bolt and washer.

8. The electric motor and belt transmission shaft system as claimed in claim 1 comprising:
   the shaft receiver receiving the transmission shaft; and
   the shaft receiver securing the transmission shaft in place while allowing rotational movement.

9. The electric motor and belt transmission shaft system as claimed in claim 1 comprising:
   the pulley being received by the pulley keyway; and
   the pulley rotating as the transmission shaft rotates due to the electric motor rotation.

10. An electric motor and belt transmission shaft system comprising:
    an electric motor;
    a transmission shaft;
    a prototype transmission casing;
    a pulley;
    the transmission shaft comprising a plurality of splines, a plurality of bearings, a plurality of bearing stops, a pulley keyway, and a threaded end;
    the prototype transmission casing comprising a shaft receiver;
    the electric motor being mechanically connected to the transmission shaft;
    the prototype transmission casing encompassing a portion of the transmission shaft;
    the pulley being mechanically connected to the terminal end of the transmission shaft opposite the electric motor;
    The transmission shaft being a cylindrical shape;
    the plurality of splines traversing along the length of the terminal end of the transmission shaft;
    the plurality of splines mechanically connecting the transmission shaft to the electric motor;
    the plurality of bearings being positioned along the transmission shaft;
    the plurality of bearings comprising a left and a right bearing;
    the plurality of bearings securing the transmission shaft within the prototype transmission casing; and
    the plurality of bearings allowing for rotational motion along the transmission shaft central axis.

11. The electric motor and belt transmission shaft system as claimed in claim 10 comprising:

the left bearing being positioned further away from the plurality of splines than the right bearing; and the left bearing having a larger diameter than the right bearing.

12. The electric motor and belt transmission shaft system as claimed in claim 10 comprising:

the plurality of bearings stops being positioned in between the plurality of bearings;

the plurality of bearing stops comprising a left bearing stop and a right bearing stop; and the plurality of bearing stops having a cylindrical shape.

13. The electric motor and belt transmission shaft system as claimed in claim 12 comprising:

the left bearing stop being positioned adjacent to the left bearing;

the right bearing stop being positioned adjacent to the right bearing;

the plurality of bearing stops having a larger diameter than the plurality of bearings; and the right bearing stop having a smaller diameter than the left bearing stop.

14. The electric motor and belt transmission shaft system as claimed in claim 10 comprising:

the pulley keyway being positioned along the terminal end of the transmission shaft opposite the plurality of splines;

the pulley keyway not being encompassed by the prototype transmission casing;

the threaded end being positioned along the terminal end of the transmission shaft adjacent to the pulley keyway; and the threaded end receiving an external bolt and washer.

15. The electric motor and belt transmission shaft system as claimed in claim 10 comprising:

the shaft receiver receiving the transmission shaft; and the shaft receiver securing the transmission shaft in place while allowing rotational movement.

16. The electric motor and belt transmission shaft system as claimed in claim 10 comprising:

the pulley being received by the pulley keyway; and the pulley rotating as the transmission shaft rotates due to the electric motor rotation.

17. An electric motor and belt transmission shaft system comprising:

an electric motor;

a transmission shaft;

a prototype transmission casing;

a pulley;

the transmission shaft comprising a plurality of splines, a plurality of bearings, a plurality of bearing stops, a pulley keyway, and a threaded end;

the prototype transmission casing comprising a shaft receiver;

the electric motor being mechanically connected to the transmission shaft;

the prototype transmission casing encompassing a portion of the transmission shaft;

the pulley being mechanically connected to the terminal end of the transmission shaft opposite the electric motor;

The transmission shaft being a cylindrical shape;

the plurality of splines traversing along the length of the terminal end of the transmission shaft;

the plurality of splines mechanically connecting the transmission shaft to the electric motor;

the plurality of bearings being positioned along the transmission shaft;

the plurality of bearings comprising a left and a right bearing;

the plurality of bearings securing the transmission shaft within the prototype transmission casing;

the plurality of bearings allowing for rotational motion along the transmission shaft central axis;

the left bearing being positioned further away from the plurality of splines than the right bearing; and the left bearing having a larger diameter than the right bearing.

18. The electric motor and belt transmission shaft system as claimed in claim 17 comprising:

the plurality of bearings stops being positioned in between the plurality of bearings;

the plurality of bearing stops comprising a left bearing stop and a right bearing stop;

the plurality of bearing stops having a cylindrical shape;

the left bearing stop being positioned adjacent to the left bearing;

the right bearing stop being positioned adjacent to the right bearing;

the plurality of bearing stops having a larger diameter than the plurality of bearings; and the right bearing stop having a smaller diameter than the left bearing stop.

19. The electric motor and belt transmission shaft system as claimed in claim 17 comprising:

the pulley keyway being positioned along the terminal end of the transmission shaft opposite the plurality of splines;

the pulley keyway not being encompassed by the prototype transmission casing;

the threaded end being positioned along the terminal end of the transmission shaft adjacent to the pulley keyway;

the threaded end receiving an external bolt and washer;

the shaft receiver receiving the transmission shaft; and the shaft receiver securing the transmission shaft in place while allowing rotational movement.

20. The electric motor and belt transmission shaft system as claimed in claim 1 comprising:

the pulley being received by the pulley keyway; and the pulley rotating as the transmission shaft rotates due to the electric motor rotation.

* * * * *